United States Patent
Wilson

[15] 3,669,476
[45] June 13, 1972

[54] SELECTIVE FRONT WHEEL DRIVE HUB

[72] Inventor: Denney R. Wilson, Ossian, Ind.
[73] Assignee: Dana Corporation, Toledo, Ohio
[22] Filed: June 25, 1971
[21] Appl. No.: 156,631

[52] U.S. Cl..........................................287/53 R, 192/67 R
[51] Int. Cl..................................................F16d 1/06
[58] Field of Search.............287/53 R; 192/67 R, 93 A, 94, 192/95

[56] References Cited

UNITED STATES PATENTS

| | | | |
|---|---|---|---|
| 1,536,778 | 5/1925 | Denham | 287/53 R |
| 3,124,377 | 3/1964 | O'Brien et al. | 192/67 R |
| 3,442,361 | 5/1969 | Hegar | 192/67 R |

Primary Examiner—Andrew V. Kundrat
Attorney—Walter E. Pavlick et al.

[57] ABSTRACT

A drive hub is provided having an inner actuating sleeve operatively connected to and selectively controlled by a manual external actuator and wherein a coupling connection is provided between the actuating sleeve and a cooperating outer clutch gear, so that when the manual actuator is operated in either direction, the actuating sleeve will move axially relative to the clutch gear to apply a preload thereon. The coupling connection includes a pair of spaced tabbed guide washers slidably supported between the actuating sleeve and the clutch gear and a coil spring interposed between the washers.

10 Claims, 6 Drawing Figures

PATENTED JUN 13 1972 3,669,476

INVENTOR.
DENNEY R. WILSON
BY Walter E. Pavlick
ATTORNEY

INVENTOR.
DENNEY R. WILSON

ATTORNEY

SELECTIVE FRONT WHEEL DRIVE HUB

BACKGROUND OF THE INVENTION

1. Field of the Invention

This invention relates to hub clutches for the front wheels of a four wheel drive vehicle and more particularly to such a clutch having a pair of interlocking clutch members wherein one of the members is movable parallel to the axis of rotation for establishing or interrupting a driving connection between a driving axle and a driven hub of a wheel.

2. Description of the Prior Art

Vehicles having optional two or four wheel drive are becoming more desirable. Since two wheel drive is normally desirable for highway use, while four wheel drive is many times desirable in back country operation or under excessive or difficult load conditions where the traction furnished by the conventional two wheel drive would be insufficient.

Conventional hub clutches for this purpose are well known and normally include a manual actuator connected to the axially movable clutch member through a resilient means. The resilient means is provided to enable the operator to move the actuator to a selected position at any time and if the clutch members are not aligned or if excessive wind-up is present, permits the resilient means to function to preload the clutch member, and when the desired condition exists will serve to unload and thereby move the clutch member to its preselected position.

One of the known devices for accomplishing this function is shown in the Hegar U.S. Pat. No. 3,442,361. While providing a structure which operates satisfactorily, it requires a multitude of parts and in addition to two sets of springs, one set operative in one direction and the other set operative in the other direction. One device is shown in U.S. Pat. No. 1,536,778 having a single coil spring concentrically disposed with respect to an axle shaft but provides preload in only one direction of operation. Other devices are known wherein resilient means is provided to react on the axially movable member to effect movement thereof but all relate to structure much more complicated normally requiring a plurality of circumferentially disposed spring means which are operative in one direction only.

SUMMARY OF THE INVENTION the present invention overcomes the above problems by providing in a hub clutch, between the manual actuator and the axially movable clutch member, a coupling connection which includes a first sleeve operatively connected to the manual actuator through a cam arrangement and a second sleeve provided on the clutch member and adapted to be operatively connected to the first sleeve by means of a coil spring interposed therebetween. A pair of spaced washers are positioned on opposite ends of the coil spring to be slidably carried by but rotatable with the sleeves and adapted to cooperate with abutment means provided on the sleeves to enable the first sleeve to be moved axially to apply a preload on the clutch member through the coil spring regardless of the direction of movement of the first sleeve.

Accordingly, it is an object of this invention to provide a single spring means for a hub clutch which is capable of applying a preload on an axially movable clutch member regardless of the direction of movement.

Another object of this invention is to provide an improve coupling connection between concentrically arranged relatively movable sleeve and clutch members which prevents engagement of the clutch member if it is not positioned properly and will operate to complete the engaging operation when the clutch member becomes properly positioned.

A further object is to provide a single spring for a hub clutch which has a dual function and which is positioned in such a manner with respect to the operating members so as to prevent cocking of the same under the various operating conditions.

An additional object is to provide a hub clutch which is very compact and more simple than previous devices of this type.

The above and other objects, advantages and features of the present invention will become more readily understood and appreciated from a consideration of the following detailed description of the preferred embodiment when taken together with the accompanying drawings, in which:

DESCRIPTION OF THE PREFERRED EMBODIMENTS

Figures 1, 6:
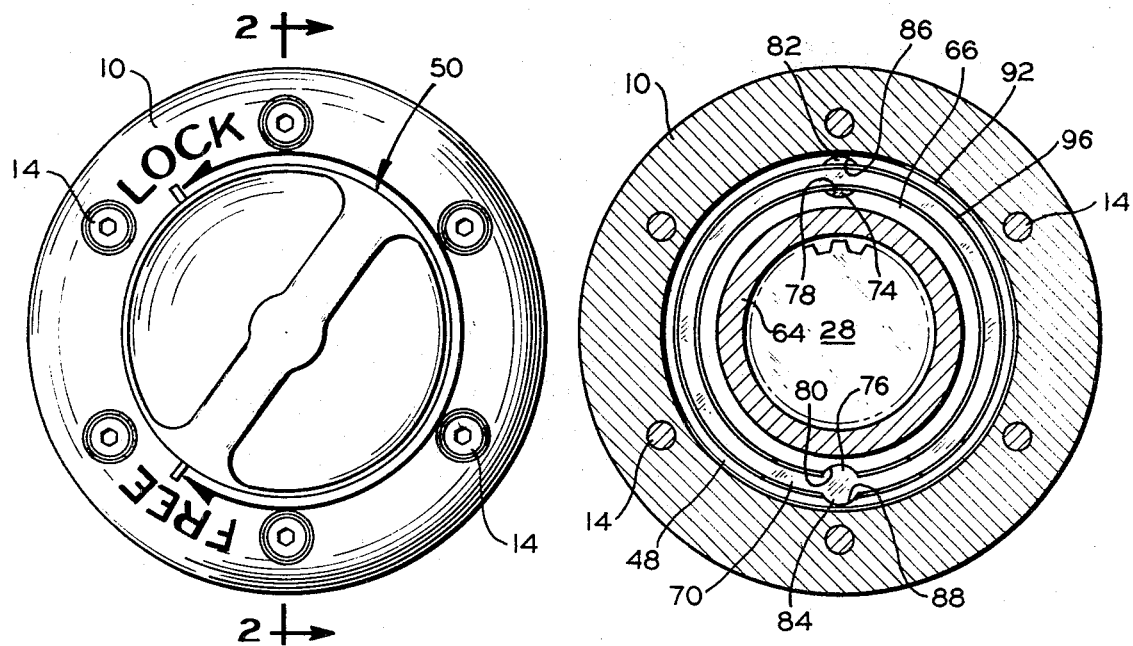
FIG. 1 is an end view of the hub clutch of the present invention.
FIG. 6 is a view taken along line 6—6 or FIG. 2 to more clearly show the washers and their connection between the sleeve and outer clutch member.
Figure 2:
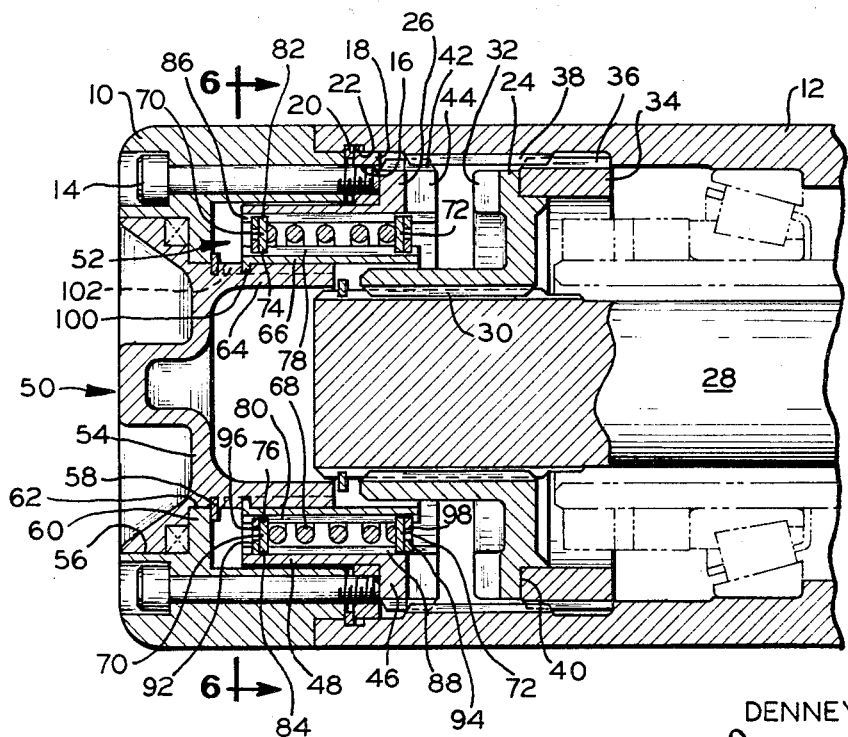
FIG. 2 is a sectional view taken along line 2—2 of FIG. 1 showing the hub clutch in its disengaged position.

Referring now to the drawings and more particularly to FIGS. 1 and 2, a cylindrical housing 10 is shown which is adapted to be secured to a wheel hub 12 by means of a plurality of bolts 14. These bolts 14 have their ends threadedly received in bores 16 provided in an annular ring 18 which is positioned within the open outer end of the wheel hub 12 and retained therein by means of a snap ring 20 adapted to partially engage the inner end of the housing 10 and partially fit into an annular groove 22 provided in the interior of the wheel hub 12 adjacent the outer end thereof.

First and second toothed members 24 and 26 are provided for selectively effecting a driving connection between a power shaft 28 and the wheel hub 12.

The first toothed member 24 or inner clutch member is provided with a splined bore 30 for drivingly receiving the outer splined end of the power or axle shaft 28 thereby fixing the first or inner toothed member 24 to the power shaft for rotation therewith. The outer or left face of the inner clutch member 24 is provided with axially outwardly extending face coupling teeth 32. For locating and guidingly supporting the inner clutch member 24 with respect to the wheel hub 12 and axle shaft 28, an annual bushing 34 is provided which has external splines 36 provided on the outer periphery thereof for cooperatively engaging an internally splined portion 38 formed on the interior of the wheel hub 12 so that the bushing 34 is locked with respect to the wheel hub 12. An annular notch 40 is cut into the back face of the clutch member 24 for piloting the bushing 34 therein so that the clutch member 24 is capable or relative rotation with respect to the bushing 34 when the clutch members are disengaged such as shown in FIG. 2.

The second toothed member 26 or outer clutch member has an externally splined peripheral portion 42 identical to the splines 36 on the bushing 34 for meshing engagement with the inter splines 38 provided on the interior of the wheel hub 12. This spline connection permits the outer clutch member 26 to rotate with the wheel hub 12 but be axially movable relative thereto. The inner or right face of the clutch member 26 has inwardly directed face coupling teeth 44 which are engageable with the face coupling teeth 32 on the inner clutch member 24 upon axial sliding movement of the outer clutch member 26 within the wheel hub 12 and with respect to the axle shaft 28.

As seen in FIG. 2 the outer clutch member 26 includes a radially outwardly extending flange portion 46 which has its outer or left face in abutting engagement with the retainer ring 18 with the coupling teeth 44 formed on the opposite face and also has an axially outwardly extending hollow sleeve portion 48 projecting to the left so as to be partially received in the housing 10.

Means is provided for effecting axial movement of the outer clutch member 26 with respect to the inner clutch member 24. To this end an actuator means is provided for causing engagement and disengagement of the clutch members and includes a manual actuator 50 and a lost motion coupling connection shown generally by the reference numeral 52 with the coupling forming an operative connection between the actuator 50 and the outer clutch member 26. More particularly, the actuator 50 includes an annular control member 54 which is rotatably mounted in a recessed portion 56 provided in the outer end of the housing 10 and is held in its operating position by a snap ring 58 located to the inside of a radially inwardly projecting flange portion 60 provided on the housing 10 adjacent the recessed portion 56. A central opening 62 is provided in the flange portion 60 for receiving an axially inwardly extending annular hub portion 64 which is an integral part of the control member 54 and extends axially inwardly a substantial distance within the hollow sleeve portion 48 provided on the outer clutch member 26, but spaced therefrom.

The coupling means forming the lost motion connection between the actuator 50 and the outer clutch member 26 includes a tubular sleeve 66, which is operatively connected to the hub portion 64 of the actuator 50, and spring means in the form of a single helical coil spring 68 concentrically disposed about the outer periphery of the sleeve 66 in the space provided between the sleeve 66 and the sleeve portion 48 of the outer clutch member 26. As seen in FIG. 2, the sleeve 66 is slidably mounted on the hub 64 of the actuator having an outside diameter substantially smaller than the inside diameter of the hollow sleeve portion 48 integrally carried by the outer clutch member 26 but having an axial length substantially equal thereto and with the spring 68 positioned within the space provided therebetween. Thus it can be seen that the spring 68 is concentrically disposed with respect to a first sleeve means which is the sleeve 66 and a second sleeve means which is the sleeve portion 48 which is carried by the second or outer clutch member 26.

A connection is provided between the first and second sleeves 48 and 66 and the spring 68 acting to permit the sleeves to be relatively movable with respect to each other so that the spring 68 is capable of being compressed and thereby providing a preload on the second or outer clutch member 26 through the integral sleeve portion 48, when an interferring condition exists with respect to the coupling teeth 32 and 42 when the teeth cannot engage due to butting of the teeth or disengagement is prevented due to torque wind-up. This connection includes a pair of identical spaced circular guides or washers 70 and 72 positioned between and at opposite ends of the first and second sleeves 48 and 66 so as to have the ends of the coil spring 68 in abutting engagement therewith. While in engagement with the ends of the spring 68 these washers are also rotatable with the sleeves 48 and 66 but axially slidable relative thereto by means of tab and groove arrangement. To this end, as best seen in FIGS. 2 and 6, each circular guide or washer 70 and 72 includes diametrically opposed sets of tabs with the radially inwardly directed arcuate tabs 74 and 76 slidably engaging diametrically opposed arcuate slots 78 and 80 provided on the outer periphery of the sleeve 66 while radially outwardly directed arcuate tabs 82 and 84 slidably engage diametrically opposed arcuate slots 86 and 88 provided on the interior periphery of the second sleeve 48.

Abutment means are also provided on opposite ends of the first and second sleeves 48 and 66 for cooperating with the washers 70 and 72 to limit axial movement thereof and to engage the same upon rotation of the manual actuator 50 to its "locked" or "free" position as seen in FIG. 1. The abutment means includes a pair of spaced snap rings 92 and 94 secured in suitable grooves provided at the opposite ends of the sleeve 48 on the interior surface thereof and a pair of similar spaced snap rings 96 and 98 secured in suitable grooves provided at opposite ends of the exterior surface of the sleeve 66.

Cam means is provided to form the operative connection between the first sleeve 66 and the control member 54 which allows the manual actuator 50 to be rotated and thereby move the sleeve 66 axially along the center line of the axle or power shaft 28 to preload the spring 68 in either direction. More particularly, the cam means includes a cam follower on the sleeve 66 and a cam slot arrangement on the hub 64 of the actuator 50. The follower is in the form of a plurality of radially inwardly extending tangs 100 provided on the outer end of the interior of the sleeve 66 which are movably received in a similar number of cam shaped slots 102 provided on the outer periphery of hub 64. These slots are constructed in such a manner as to translate the necessary movement to the sleeve 66 as the actuator 50 is rotated between its "free" and "locked" position.

Other forms of cam connections can be used between the sleeve 66 and the control member 54 to effect the necessary axial shifting of the sleeve as the manual actuator 50 is rotated, such as, for example, a screw thread or a ball and groove arrangement.

OPERATION

Figure 3:
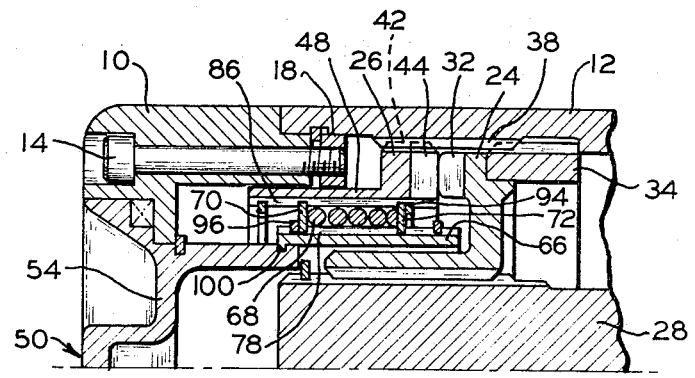
FIG. 3 is a partial upper view similar to FIG. 2 with the actuating knob rotated to the clutch engaged position but with the clutch teeth not aligned.
Figure 4:
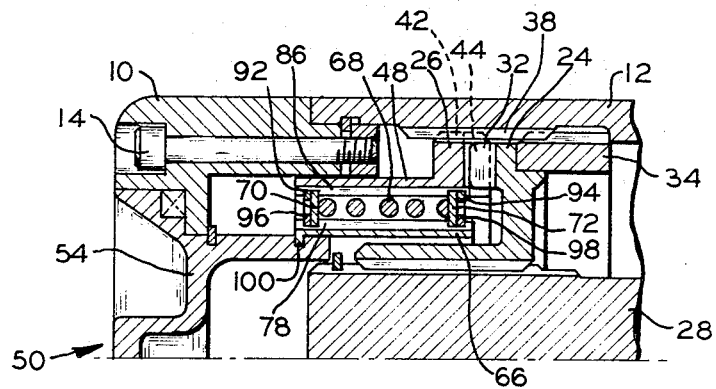
FIG. 4 is a view similar to FIG. 3 with the parts in their fully engaged position.
Figure 5:
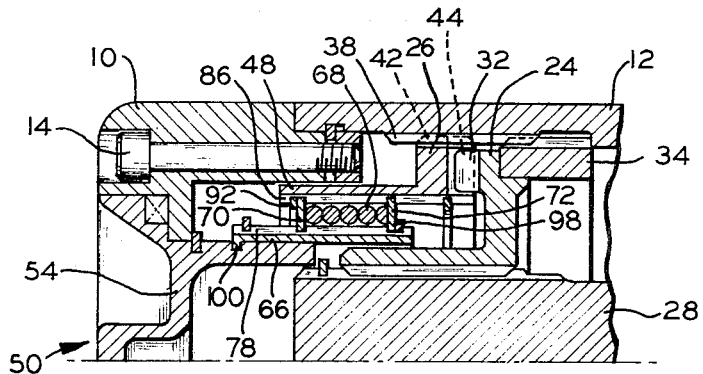
FIG. 5 is a view similar to FIG. 3 but with the actuating knob rotated to the clutch disengaged position but with torque wind-up preventing the teeth from disengaging.

It will be evident upon viewing FIGS. 3 – 5 that the snap ring 96 on the sleeve 66, as it is moved to the right (FIG. 3), engages the washer 70, upon rotation of the actuator 50 in the locking direction, to cause the coil spring 68 to be urged to the right. If the coupling teeth are not aligned and butt the coil spring 68 will be compressed and thereby apply a preload on the outer clutch member 26 through the washer 72 by means of its engagement with the snap ring 94. When the coupling teeth become aligned so that they are able to mesh, the spring 68 will be in a position to unload causing the coupling teeth to "snap" to their engaged position shown in FIG. 4. If the actuator member 50 is rotated in the opposite direction to the "free" position to disengage the hub, the sleeve 66 is moved to the left causing the snap ring 98 to engage and carry the washer 70 to the left. If, however, due to torque wind-up, the coupling teeth are not permitted to disengage they will remain engaged and the coil spring 68 will be compressed to the left against the washer 70 as it is held in a restrained position by the snap ring 92 carried by the outer clutch gear 26 thus applying a preload on the clutch member in the opposite direction. As the torque wind-up is released the spring 68 unloads to shift the clutch member out of engagement.

While only a single embodiment of this invention has been shown and described, it will be apparent that there may be changes in the structure as well as the operation without departing from the scope of this invention as defined by the appended claims.

What is claimed is:

1. In a clutch for effecting a driving connection between a power shaft and a wheel hub, the combination comprising; (1) a first toothed member adapted to be connected to the power shaft; (2) a second toothed member, (a) axially movable into and out of engagement with said first toothed member, and (b) adapted to be drivingly connected to the wheel hub; (3) actuator means for effecting movement of said second toothed member with respect to said first toothed member; (4) coupling means providing a lost motion connection between said actuator means and said second toothed member comprising; (a) a first sleeve means operatively connected to said actuator means for axial movement thereby, (b) second sleeve means carried by said second toothed member, and (c) spring means connected to said first and second sleeve means and acting therebetween whereby said first and second sleeve means are movable with respect to each other to provide a preload on said second toothed member when the teeth of said first and second toothed members are not in alignment and when said first and second toothed members are in engagement but under high torque loads.

2. Claim 1 wherein said spring means comprises a single coil spring positioned concentric with said first sleeve means.

3. Claim 1 wherein said first and second sleeve means and said spring means are positioned concentrically with respect to each other to ensure proper loading and unloading of said spring means.

4. Claim 3 wherein said connection of said spring means to said first and second sleeve means comprises a pair of spaced guides in engagement with the ends of said spring means and movable with respect to both of said first and second sleeve members.

5. Claim 4 wherein said first and second sleeve members are provided with axially extending slots and said guides have tabs movable positioned within said slots.

6. Claim 5 wherein said guides comprise circular washers positioned between said first and second sleeve means and said tabs extend both radially inwardly and outwardly from said circular washers.

7. Claim 4 wherein abutment means are provided on said first and second sleeve means to limit axial movement of said guides.

8. Claim 7 wherein one of said abutment means engages said guide means upon rotation of said actuator means in one direction to preload said second toothed member in one direction and wherein the other abutment means engages said guide means upon rotation of said actuator means in the other direction to preload said second toothed member in the other direction.

9. Claim 8 wherein said operative connection between said actuator means and said first sleeve means comprises a cam means.

10. Claim 8 wherein said cam means comprises a cam follower carried by said first sleeve means and movable in a cam slot provided in said actuator means.

* * * * *